United States Patent
Lauga

(10) Patent No.: US 8,307,634 B2
(45) Date of Patent: Nov. 13, 2012

(54) EXHAUST ARRANGEMENT FOR A VEHICLE EXHAUST LINE

(75) Inventor: Vincent Lauga, Lyons (FR)

(73) Assignee: Renault Trucks, St. Priest (FR)

( * ) Notice: Subject to any disclaimer, the term of this patent is extended or adjusted under 35 U.S.C. 154(b) by 360 days.

(21) Appl. No.: 12/665,511

(22) PCT Filed: Jul. 12, 2007

(86) PCT No.: PCT/IB2007/003053
§ 371 (c)(1),
(2), (4) Date: Dec. 18, 2009

(87) PCT Pub. No.: WO2009/007775
PCT Pub. Date: Jan. 15, 2009

(65) Prior Publication Data
US 2010/0192555 A1     Aug. 5, 2010

(51) Int. Cl.
*F01N 3/00* (2006.01)
*F01N 1/00* (2006.01)

(52) U.S. Cl. .......................................... 60/286; 60/324

(58) Field of Classification Search ............... 60/289, 60/292, 310, 324, 286, 287; 181/212, 227, 181/241; *F01N 3/20, 3/28; F02D 9/04*
See application file for complete search history.

(56) References Cited

U.S. PATENT DOCUMENTS

| | | | | |
|---|---|---|---|---|
| 6,286,307 B1 * | 9/2001 | Feeny et al. | ..................... | 60/324 |
| 2005/0091967 A1 * | 5/2005 | Sisken | ............................ | 60/285 |

FOREIGN PATENT DOCUMENTS

| | | |
|---|---|---|
| DE | 10241898 A1 | 3/2004 |
| EP | 1712751 A | 10/2006 |
| JP | 55010018 A | 1/1980 |

OTHER PUBLICATIONS

International Search Report for corresponding International Application PCT/IB2007/003053.

* cited by examiner

*Primary Examiner* — Kenneth Bomberg
*Assistant Examiner* — Jason Sheppard
(74) *Attorney, Agent, or Firm* — WRB-IP LLP

(57) ABSTRACT

This exhaust arrangement for an exhaust line having an exhaust gas treatment device and a liquid injection device located upstream of the exhaust gas treatment device includes a single moving element incorporating a throttling member having a solid closing surface and, operatively connected to the throttling member, a turbulence generating member and an actuator for controlling the position of the moving element between a first position wherein the moving element is in a retracted position and creates a minimum back pressure in the exhaust line and a second position wherein the moving element is in an extended position and creates a maximum back pressure, or selectively in at least one intermediate position wherein the moving element is in a turbulence generating position wherein the turbulence generating member intrudes at least partially into the exhaust line and creates turbulences within the flow of exhaust gases.

19 Claims, 3 Drawing Sheets

EXHAUST ARRANGEMENT FOR A VEHICLE EXHAUST LINE

BACKGROUND AND SUMMARY

The present invention regards an exhaust arrangement for an internal combustion engine.

Exhaust gas formed in the combustion of fuel in an internal combustion engine contains a proportion of undesirable substance such as nitrogen oxides (NOx), carbon monoxide (CO), un-burnt hydrocarbons (HC), soot, etc. . . .

To reduce air pollution, vehicles are therefore equipped with various systems that deal with undesirable substances in exhaust gas.

A common exhaust gas treatment is a so called selective catalytic reduction (SCR). Exhaust gas wherein ammonia is added as a reducer is treated in a specific catalytic converter where nitrogen oxides are converted into water and nitrogen which are both non toxic substances. Ammonia is introduced in the form of urea in an aqueous solution from which ammonia is obtained through hydrolysis. Urea is usually nebulised in the exhaust gases upstream of the catalytic converter. To this end, a urea injector is fitted on the exhaust line upstream the catalytic converter.

One of the key elements in a successful exhaust gas treatment in an SCR system is a homogenous mixing of the additive—in this case, urea droplets—in the hot exhaust gases. If the urea is insufficiently mixed in the exhaust gases, there is a risk of urea crystallisation. This has a detrimental effect on the NOx reduction that takes place in the catalytic converter and ultimately untreated NOx are rejected in the air as the reduction reaction that occurs in the catalytic converter is incomplete.

A mere injection of urea in the exhaust gases is largely insufficient to provide a homogeneous mixing of urea droplets in the flow of exhaust gases. This is why, in engines equipped with a SCR catalytic converter, the exhaust line can include a mixer that creates turbulences in the otherwise largely laminar exhaust flow and thereby encourages a homogenous mix of urea droplets in the exhaust gases.

Although the effect of the mixer is beneficial to an efficient working of the SCR catalytic converter, it may also be detrimental to engine efficiency and especially fuel consumption as the mixer hinders the exhaust gas flow.

Another point where exhaust gases are concerned relates to exhaust brakes.

An engine, generally a diesel engine, that powers an industrial vehicle such as a truck can be commonly equipped with an exhaust brake. Existing exhaust brakes can be of different design but operate on the principle of creating a back pressure in the exhaust manifold. An exhaust brake closes partially or totally the flow of exhaust gas that is released by the engine cylinders after combustion. By doing so, the exhaust gases are compressed in the exhaust manifold and in the engine cylinder. The exhaust back pressure is used to counteract the motion of the piston engine and then helps to slow down the vehicle. Although it is beneficial to improve additive homogenization in exhaust gas so as to improve depollution treatment efficiency and although it is desirable to have some exhaust gas restriction to help slow down a vehicle especially a heavy vehicle, it is also desirable to avoid any disruption in the flow of exhaust gas. In other terms, any device added onto an engine exhaust line such as for example an exhaust gas mixer and an exhaust brake ultimately impairs engine efficiency and tends to increase fuel consumption.

It therefore appears that there is room for improvement in the way exhaust gases are handled after they are generated in an engine cylinder and before they are treated in a pollution reducing device.

It is therefore desirable to promote homogenization of liquid additive in exhaust gas when an internal combustion engine is in an operative mode that ensures insufficient additive homogenization and to offer supplemental braking resource and to promote low fuel consumption.

It is also desirable to provide an exhaust gas arrangement that can be integrated into a vehicle architecture with minimal structural and functional disruption.

An aspect of the invention concerns an exhaust arrangement for an exhaust line having an exhaust gas treatment device and a liquid injection device located upstream of the exhaust gas treatment device; the said exhaust arrangement comprises a single moving element incorporating a throttling member having a closing surface at least substantially equal to the cross section of the exhaust line and, operatively connected to the said throttling member, a turbulence generating member; the said exhaust arrangement further comprises actuating means for controlling the position of the said moving element between a first position wherein the moving element is in a retracted position and creates a minimum backpressure in the exhaust line and a second position wherein the shutter member is in an extended position and creates a maximum back pressure; the actuating means can position the moving element selectively in at least one intermediate position between the said first and second positions wherein the moving element is in a turbulence generating position wherein the turbulence generating member intrudes at least partially into the exhaust line and creates turbulences within the flow of exhaust gas.

The invention therefore provides, according to an aspect thereof, an exhaust arrangement that is a single operational unit which therefore can be integrated into a vehicle architecture without substantial redesign to accommodate the said arrangement. Further the exhaust arrangement according to this invention combines two functional effects namely (i) creating turbulence in a flow of exhaust gas and (ii) at least partly shutting off the flow of exhaust gas depending on its position in an exhaust flow while being unobtrusive (and therefore without any impact on fuel consumption) when the vehicle operational conditions do not require either to create turbulence in the exhaust flow or to shut off the exhaust line.

According to an embodiment of the invention, the moving element is transversally mobile with respect to the exhaust line; the moving element is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the mobile element is in a turbulence generating position wherein the turbulence generating member intrudes at least partially into the exhaust line and creates turbulence within the flow of exhaust gases.

Preferably, the turbulence generating member extends from the throttling member.

Advantageously, the turbulence generating member has a surface at least equal to the section of the exhaust line so that the moving element can be set on a position wherein the entire section of the exhaust line is covered by the turbulence generating member. This promotes the creation of homogenate turbulence within the flow of exhaust gas.

It can be envisaged that the turbulence generating member can comprise an array of strips defining at least one opening.

The exhaust gas that passes through the at least one opening changes from a laminar flow to a turbulent flow. in practical terms, the array of strips can comprise two sets of perpendicular strips.

In order to increase the turbulence in the flow of exhaust gas, at least one of the strips can be provided with a spoiler on the downstream side of the turbulence generating member.

Advantageously, the exhaust line is provided with a housing that accommodates the turbulence generating member when the moving element is in the second extreme position. This disposition makes it possible to entirely seal the exhaust line with the throttling member when the vehicle operational conditions require supplemental braking power.

Further, the throttling member can have a surface at least substantially equal to the section of the exhaust line; this feature of the invention makes it possible to substantially or fully seal the exhaust line and therefore to create a maximum back pressure.

In a further embodiment of the invention, the moving element is axially mobile within the exhaust gas flow path and is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the mobile element is in a turbulence generating position wherein the turbulence generating member intrudes at least partially into the exhaust line and creates turbulences within the flow of exhaust gases. To seal the exhaust line and therefore to create a maximum back pressure, the moving element can comprise a throttling element the surface of which equals the section of the exhaust valve and at least one protruding member extending from the throttling element.

The protruding member which generates the turbulence within the flow of exhaust gas can be comprised of an array of strips that extend perpendicularly from the throttling member.

So as to further enhance the turbulence created within the flow of exhaust gas, at least one the strip can be provided with a spoiler.

Besides, the exhaust line can be provided with a wall that surrounds the moving element when the said moving element is in a fully retracted position to maintain the flow of exhaust gas as laminar as possible when the moving element is in a fully retracted position.

The invention also concerns, according to an aspect thereof, an internal combustion engine, which includes an exhaust arrangement as above described.

DETAILED DESCRIPTION

Figure 1:
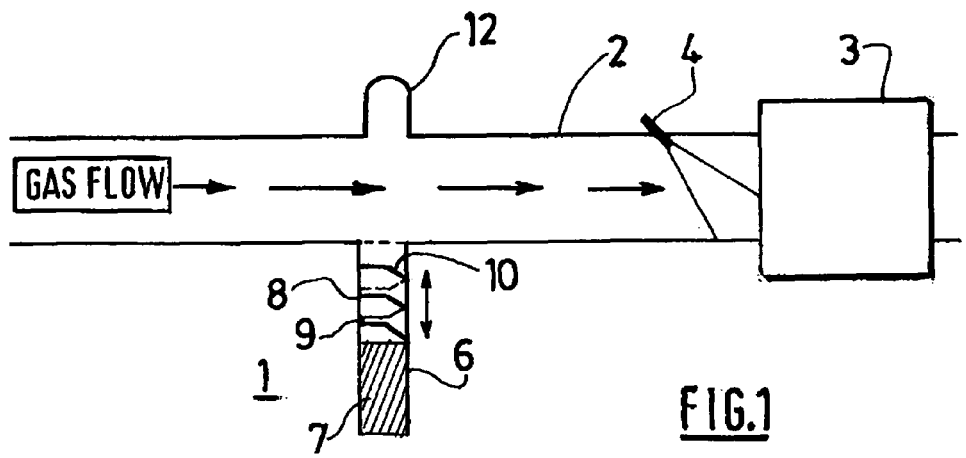
FIG. 1 to FIG. 3 show schematically an embodiment of an exhaust arrangement according to the invention in three possible functional configurations.
Figure 2:
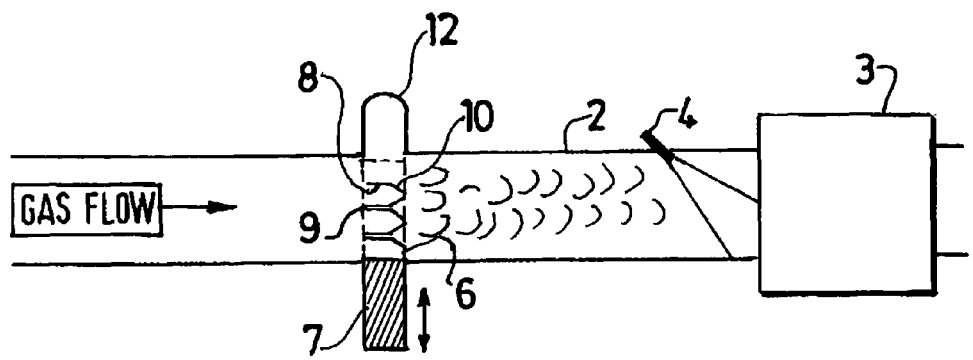
Figure 3:
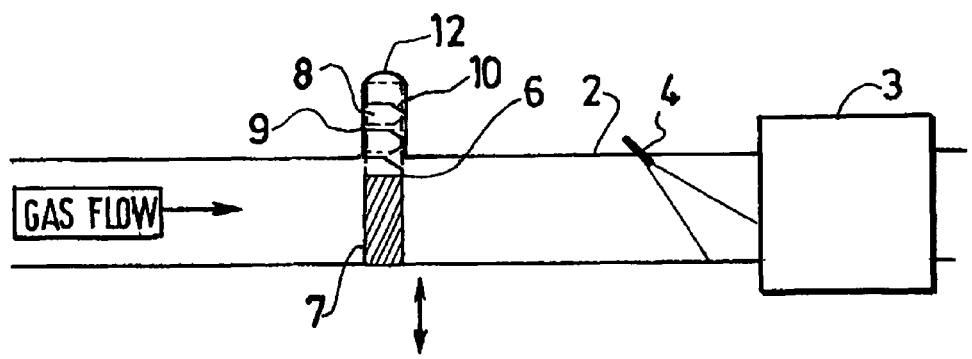

FIGS. 1 to 3, which illustrate a first embodiment of the invention, show an exhaust line of an internal combustion engine. The exhaust line is connected to a cylinder head of an internal combustion engine (not shown) and guides exhaust gases away from the combustion chamber. The exhaust line can commonly incorporate a turbo charger to increase the engine power, one or several exhaust gas treatment devices to reduce pollution and a silencer to reduce noise.

FIG. 1 shows schematically a portion of an exhaust line 2 located downstream of an internal combustion engine which may include a turbocharger and upstream of an exhaust gas treatment device 3 such as for example a SCR catalytic converter. The exhaust line 2 may be circular, oval or may be of any other shaped cross section.

In the case of a diesel engine, the exhaust gas treatment device 3 can include a SCR catalytic converter. The exhaust gas treatment device can also include a diesel particle filter DPF.

As it is commonly known in the art, the exhaust line 2 is equipped with an injector 4 which nebulizes a liquid into the flow of exhaust gas; the liquid participates to the depollution treatment that takes place in the exhaust gas treatment device. When the vehicle is fitted with a SCR catalytic converter, the liquid injected into the exhaust gas can be a solution of urea and water. The urea that is incorporated in the exhaust gas is a reducer in the oxidation reaction that takes place in the SCR catalytic converter; thus, NOx contained in the exhaust gas are converted into water and nitrogen.

As can be seen on FIGS. 1 to 3, the exhaust line 2 is also fitted with an exhaust arrangement 1 that, in the embodiment illustrated on these Figures, is transversally arranged with regards to the exhaust line 2. The exhaust arrangement 1 can be comprised of a single moving element 6 that is controlled by an actuating means.

The moving element 6 includes a throttling member 7 and, at the free end of the throttling member 7, a turbulence generating member 8. The throttling member 7 can be comprised of a solid piece of metal or of composite material onto which the turbulence member is attached. The turbulence generating member 8 can be made of an array of strips or blades that define a plurality of openings 9. The turbulence generating member 8 can, for example, be comprised of two sets of perpendicular strips that form a grid. The strips can be made of metal or of composite material. It is envisaged that one or all the strips can be provided with a spoiler 10. Conveniently, the spoilers 10, which can be found on the turbulence generating member 8, are formed within the strips. As illustrated, the moving element 6 is a single element that includes two sub elements namely a throttle member 7 which is a solid element and a turbulence generating member 8 which is provided with a plurality of openings. In the embodiment depicted on FIGS. 1 to 3, the moving element 6 is oriented substantially perpendicularly with respect to the flow of exhaust gases in a guillotine fashion. It can be noted that a housing 12 is provided in the exhaust line 2; this housing 12 is diametrically opposed to the moving element 6. The housing 12 is dimensioned to accommodate at least the turbulence generating element. The actuating means (not illustrated) can be comprised of a pneumatic, electric or hydraulic actuator. Via, for example, a vehicle CAN bus, the actuator can be controlled by a vehicle controller that, for example, includes a CPU, a RAM and a ROM.

Depending on the action of the vehicle controller on the actuating means, the moving element 6 can have a linear movement between two extreme positions.

The actuator can control the position of the moving element 6. Upon an order transmitted by the vehicle controller to the actuating means, the moving element 6 can be placed in various positions within the exhaust line 2. A first extreme position, illustrated on FIG. 1, is defined as a fully retracted position. In this position, the moving element 6 does not have any interference with the exhaust line 2; in other words, the tip of turbulence generating element which forms the extremity of the moving element 6 is aligned with the inner surface of the exhaust line 2. A second extreme position, illustrated on FIG. 3, is defined as a fully extended position. In this position, the moving element 6 is pushed into the exhaust line 2, that is to say the throttling member 7 substantially or fully seals off the exhaust line 2 while the turbulence generating member 8 is accommodated in the housing 12. The moving element 6 can also be positioned in at least one intermediate position between the first extreme position i.e. fully retracted and the second extreme position i.e. fully extended as for example illustrated on FIG. 2. Preferably, there will be several possible intermediate positions, and possibly, the actuating means will be able to position the moving element in any intermediate position to achieve a very accurate control of the amount of turbulence created in the exhaust flow.

As this will be apparent, the moving element 6 proves extremely useful on several levels.

Figure 4:
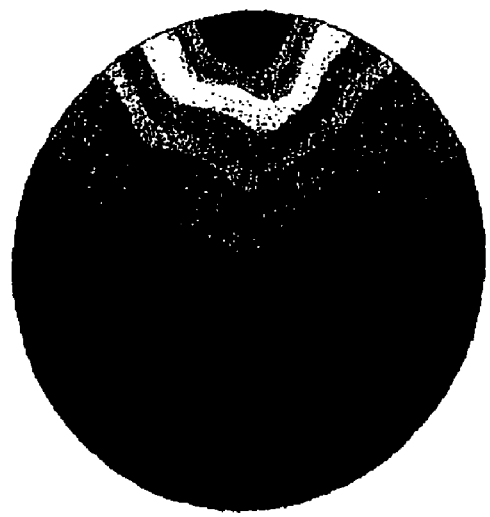
FIG. 4 is a cross sectional view taken downstream of a liquid injector of an exhaust line of the prior art.
Figure 5:
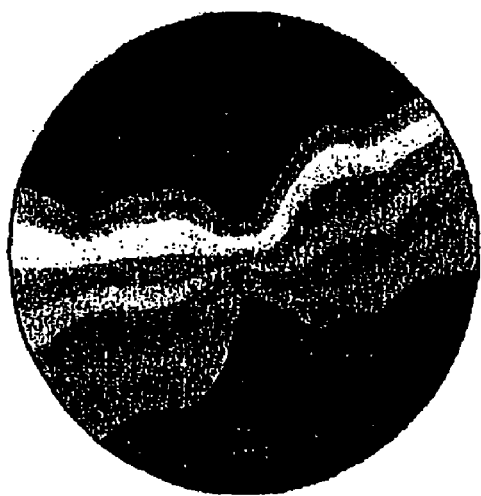
FIG. 5 is a cross sectional view taken downstream of a liquid injector of an exhaust line having the exhaust arrangement of the invention.

Firstly, the moving element 6 can efficiently create turbulences in the exhaust line 2. Depending on the operative conditions of the engine, it can be necessary to inject urea into the exhaust gas before the exhaust gas enters the SCR converter. Typically when the engine is running at low temperature and/or the engine is running at low revs, the urea can be insufficiently mixed with the exhaust gas with the above mentioned detrimental effect on the SCR converter. When the engine is running under these or other operative conditions wherein urea is insufficiently mixed with the exhaust gases, the vehicle controller can transmit an order to the actuating means asking the said actuating means to place the moving element 6 into a position where the turbulence generating member 8 is inserted within the exhaust line 2. The exhaust gas passes through the turbulence generating member 8 of the moving element 6; downstream of the moving element 6, the flow of exhaust gas is largely turbulent. The plurality of openings 9 provided in the turbulence generating member 8 creates eddies in the otherwise laminar flow of exhaust gas. FIG. 4 and FIG. 5 illustrate the effect of the turbulence generating member 8 on the urea droplets homogenization within the exhaust gases.

FIG. 4 shows that the urea droplets are mainly confined around the urea injection nozzle and fail to mix with the exhaust gases.

In contrast, FIG. 5 illustrates a significantly improved homogenization of the urea within the exhaust gases. FIG. 5 shows that the urea mixes in a substantially uniform manner in the flow of exhaust gases. Ultimately, the urea mixed with the exhaust gases has a more efficient catalytic effect.

In a preferred embodiment of the invention, the section of the turbulence generating member 8 equals the section of the exhaust line 2 so as to create within the flow of exhaust gas a homogenous turbulence that will guarantee a homogenous mixing of urea within the exhaust gas and ultimately an efficient reaction in the SCR catalytic converter.

The exhaust arrangement 1 has the further advantage of operating as an exhaust brake when required. As depicted on FIG. 3, the moving element 6 includes a throttling member 7 that can shut off the flow of exhaust gases. This feature of the exhaust arrangement 1 proves useful when the vehicle driver applies the brakes to slow down the vehicle. Upon an action from the driver on the vehicle brake pedal, the vehicle controller can transmit an order to the actuating means to place the moving element 6 in a position such that the throttling member 7 shuts off partially or entirely the exhaust line 2.

Thus, the moving element 6 creates a back pressure that contributes to slow down the vehicle.

Figure 6:
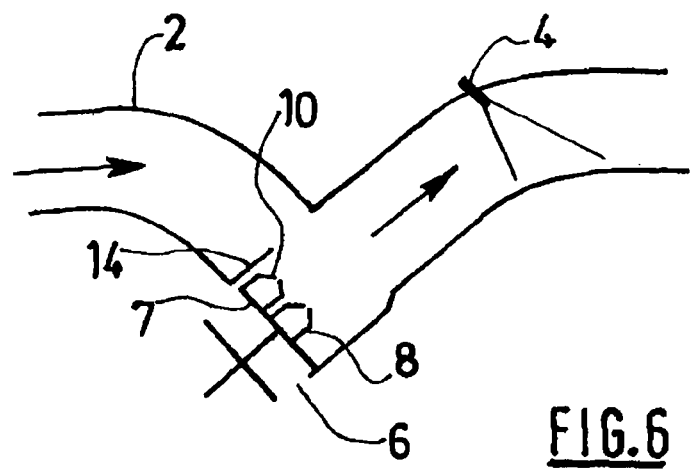
FIG. 6 to FIG. 8 show schematically an embodiment of an exhaust arrangement according to the invention in three possible functional configurations.
Figure 7:
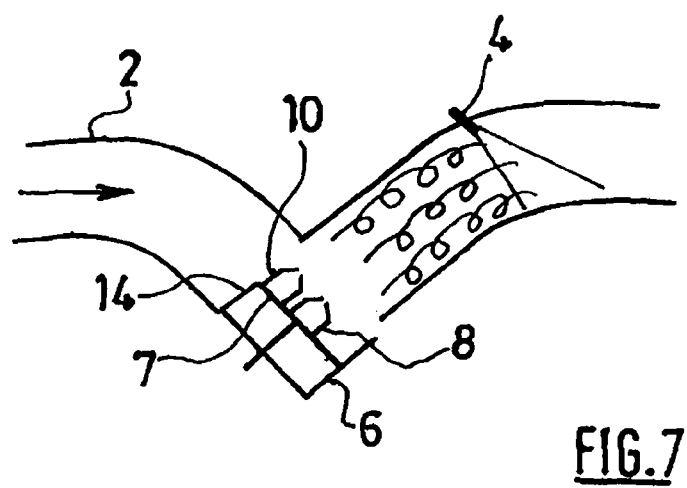
Figure 8:
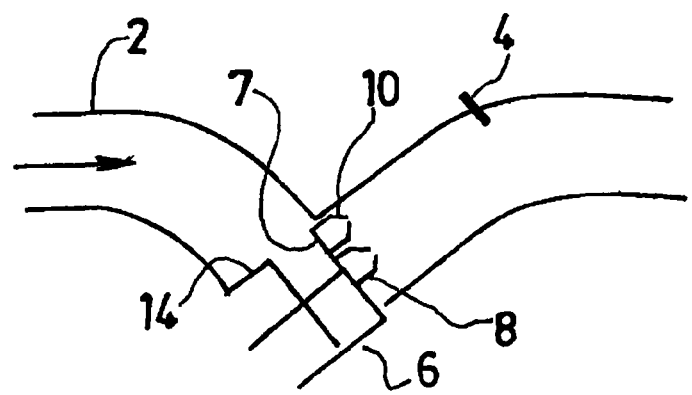

The illustrated exhaust arrangement 1 significantly improves the way exhaust gases are treated as the exhaust arrangement 1 is used to improve the efficiency of the exhaust gas treatment when an exhaust gas treatment is required by the vehicle operating conditions and that the exhaust arrangement 1 does not interfere with the exhaust gases and therefore has no detrimental effect on fuel consumption when the flow of exhaust gases can create by its speed and/or temperature the conditions of a suitable mixture with the urea solution droplets; additionally the exhaust arrangement 1 according to the invention integrates a further aspect wherein the exhaust arrangement 1, as a single functional unit, is also used as an exhaust brake. The exhaust arrangement 1 of the invention therefore brings together two functions in a single functional unit. FIGS. 6 to 8 depict a further embodiment of the invention wherein the moving element 6 is displaced substantially axially in the flow of exhaust gas. In this embodiment of the invention, the moving element 6 incorporates a throttling member 7 that is fitted with a turbulence generating member 8 and an actuating means. The throttling member 7 is perpendicularly oriented with regard to the exhaust flow. The throttling member 7 is comprised of a solid piece of metal or of composite material. The actuating means—i.e. a pneumatic, hydraulic or electric actuator connected to a vehicle controller—are attached onto one side of the throttling member 7 whereas, on the opposite side, the throttling member 7 is equipped with a turbulence generating member 8. The turbulence generating member 8 can be comprised of a protruding member such as for example an array of strips that can have a spoiler.

When the moving element 6 is in a fully retracted position, the exhaust arrangement 1 has almost no incidence on the flow of exhaust gas, as shown on FIG. 6. In this position, the moving element 6 can be surrounded by a wall 14 that is shaped and sized to maintain the flow of exhaust gas as laminar as possible when the moving element 6 is in a fully retracted position.

FIG. 7 shows the moving element 6 in an intermediate position that is to say a position wherein the turbulence generating member 8 moves into the exhaust line 2 and disrupts the flow of exhaust gas. The turbulence created in the exhaust gases helps a better mix of urea with the exhaust gas. Depending on the position of the moving element 6 in the exhaust flow, the turbulence in the exhaust flow is more or less significant. Thus, the invention makes it possible to adjust the level of turbulence within the exhaust gas according to the vehicle operational mode. When the moving element 6 is in a fully extended position as shown on FIG. 8; the moving element 6 acts as an exhaust brake.

The invention describes an exhaust arrangement 1 that can combine two functional effects namely (i) creating turbulence in a flow of exhaust gas and (ii) closing the flow of exhaust gas depending on its position in an exhaust flow while being unobtrusive (and therefore without any impact on fuel consumption) when the vehicle operational mode does not require either to create turbulence in the exhaust flow or to shut off the exhaust line 2.

The invention is not limited to the illustrative embodiments described above and shown in the drawings, but can be varied within the scope of the following patent claims. For example, in the embodiments described above, various changes may be made in the turbulence generating member. The invention is also applicable to the injection of any additive in liquid phase in exhaust gas prior to a depollution treatment, such as the injection of fuel upstream of a dust particulate filter. Also, it could be that the exhaust arrangement is located downstream of the injection device, instead of upstream as shown on the figures, while of course still being upstream of the exhaust gas treatment device.

The invention claimed is:

1. An exhaust arrangement for an exhaust line having an exhaust gas treatment device and a liquid injection device located upstream of the exhaust gas treatment device comprising:
    a single moving element incorporating a throttling member having a closing surface and, operatively connected to the throttling member, a turbulence generating member and
    an actuator for controlling a position of the moving element between a first position wherein the moving element is in a retracted position and creates a minimum backpressure in the exhaust line and a second position wherein the moving element is in an extended position and creates a maximum back pressure, or selectively in at least one intermediate position wherein the moving element is in a turbulence generating position wherein the turbulence generating member intrudes at least partially into the exhaust line and creates turbulences within a flow of exhaust gases through the exhaust line,
    wherein the turbulence generating member extends from the throttling member and is provided with a plurality of openings through which the exhaust gases flow.

2. The exhaust arrangement according to claim 1, wherein the moving element is transversally mobile with respect to the exhaust line and is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the moving element is in a turbulence generating position wherein the turbulence generating member intrudes at least partially into the exhaust line and creates turbulences within the flow of exhaust gas.

3. An exhaust arrangement for an exhaust line having an exhaust gas treatment device and a liquid injection device located upstream of the exhaust gas treatment device comprising:
    a single moving element incorporating a throttling member having a closing surface and, operatively connected to the throttling member, a turbulence generating member and
    an actuator for controlling a position of the moving element between a first position wherein the moving element is in a retracted position and creates a minimum backpressure in the exhaust line and a second position wherein the moving element is in an extended position and creates a maximum back pressure, or selectively in at least one intermediate position wherein the moving element is in a turbulence generating position wherein the turbulence generating member intrudes at least partially into the exhaust line and creates turbulences within a flow of exhaust gases through the exhaust line,
    wherein the turbulence generating member extends from the throttling member and has a surface area at least equal to a cross-sectional area of the exhaust line.

4. An exhaust arrangement for an exhaust line having an exhaust gas treatment device and a liquid injection device located upstream of the exhaust gas treatment device comprising:
    a single moving element incorporating a throttling member having a closing surface and, operatively connected to the throttling member, a turbulence generating member and
    an actuator for controlling a position of the moving element between a first position wherein the moving element is in a retracted position and creates a minimum backpressure in the exhaust line and a second position wherein the moving element is in an extended position and creates a maximum back pressure, or selectively in at least one intermediate position wherein the moving element is in a turbulence generating position wherein the turbulence generating member intrudes at least partially into the exhaust line and creates turbulences within the flow of exhaust gases,
    wherein the moving element is transversally mobile with respect to the exhaust line and is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the moving element is in a turbulence generating position wherein the turbulence generating member intrudes at least partially into the exhaust line and creates turbulences within a flow of exhaust gases through the exhaust line, and the turbulence generating member comprises an array of strips or blades defining at least one opening.

5. The exhaust arrangement according to claim 4, wherein the array of strips or blades comprises two sets of perpendicular strips or blades.

6. The exhaust arrangement according to claim 4, wherein at least one of the strips or blades is provided with a spoiler on the downstream side of the turbulence generating member.

7. The exhaust arrangement according to claim 1, wherein the exhaust line is provided with a housing that accommodates the turbulence generating member when the moving element is in the second position.

8. The exhaust arrangement according to claim 1, wherein the throttling member has a surface area at least equal to a cross-sectional area of the exhaust line.

9. The exhaust arrangement according to claim 1, wherein the moving element is axially mobile within the exhaust gas flow path, is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the mobile element is in a turbulence generating position wherein the turbulence generating member intrudes at least partially into the exhaust line and creates turbulences within the flow of exhaust gases.

10. The exhaust arrangement according to claim 9, wherein the moving element comprises a throttling element the surface of which equals the section of the exhaust valve and a turbulence generating member having at least one protruding member extending from the throttling element.

11. An exhaust arrangement for an exhaust line having an exhaust gas treatment device and a liquid injection device located upstream of the exhaust gas treatment device comprising:

a single moving element incorporating a throttling member having a closing surface and, operatively connected to the throttling member, a turbulence generating member and an actuator for controlling a position of the moving element between a first position wherein the moving element is in a retracted position and creates a minimum backpressure in the exhaust line and a second position wherein the moving element is in an extended position and creates a maximum back pressure, or selectively in at least one intermediate position wherein the moving element is in a turbulence generating position wherein the turbulence generating member intrudes at least partially into the exhaust line and creates turbulences within a flow of exhaust gases through the exhaust line, wherein the moving element is axially mobile within the exhaust gas flow path, is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the mobile element is in a turbulence generating position wherein the turbulence generating member intrudes at least partially into the exhaust line and creates turbulences within the flow of exhaust gases, the moving element is axially mobile within the exhaust gas flow path, is capable of displacement between a first extreme position wherein the moving element is in a fully retracted position and creates a minimum backpressure in the exhaust line and a second extreme position wherein the moving member is in a fully extended position and creates a maximum back pressure, or selectively in at least one intermediate position wherein the mobile element is a turbulence generating position wherein the turbulence generating member intrudes at least partially into the exhaust line and creates turbulences within the flow of exhaust gases, and the turbulence generating member comprises an array of strips or blades.

12. The exhaust arrangement according to claim 11, wherein at least one the strip is provided with a spoiler.

13. The exhaust arrangement according to claim 9, wherein the exhaust line is provided with a wall that surrounds the moving element when the moving element is in a fully retracted position.

14. An internal combustion engine, wherein the engine includes an exhaust arrangement as claimed in claim 1.

15. The exhaust arrangement according to claim 3, wherein the turbulence generating member extends from the throttling member transversely relative to a direction of a centerline of the exhaust line.

16. The exhaust arrangement according to claim 3, wherein the turbulence generating member extends from the throttling member in a direction coinciding with a direction of a centerline of the exhaust line.

17. The exhaust arrangement according to claim 1, wherein the turbulence generating member comprises an array of strips defining the plurality of openings.

18. The exhaust arrangement according to claim 17, wherein at least one of the strips or blades is provided with a spoiler on the downstream side of the turbulence generating member.

19. The exhaust arrangement according to claim 1, wherein the exhaust gas treatment device is a SCR catalytic converter, the liquid injection device comprises a reductant injection arrangement, and the turbulence generating member is arranged to homogeneously mix the reductant with the flow of exhaust gases.

* * * * *